(12) United States Patent
Kinnan et al.

(10) Patent No.: US 8,392,546 B2
(45) Date of Patent: Mar. 5, 2013

(54) DISTRIBUTED MANAGED SYSTEM, SYSTEM COMPONENTS, AND METHODS OF COMMUNICATING COMMANDS

(75) Inventors: Keith R. Kinnan, Cypress, TX (US); Darren J. Cepulis, Houston, TX (US); Jeffrey R. Hilland, Cypress, TX (US); David A. Joy, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2230 days.

(21) Appl. No.: 11/262,020

(22) Filed: Oct. 28, 2005

(65) Prior Publication Data

US 2007/0100931 A1   May 3, 2007

(51) Int. Cl.
*G06F 15/173* (2006.01)
(52) U.S. Cl. ...................................................... 709/223
(58) Field of Classification Search .................. 709/223
See application file for complete search history.

(56) References Cited

U.S. PATENT DOCUMENTS

| 5,345,587 | A | 9/1994 | Fehskens et al. |
| 5,557,796 | A | 9/1996 | Fehskens et al. |
| 5,644,571 | A | 7/1997 | Seaman |
| 5,680,548 | A | 10/1997 | Trugman |
| 7,254,608 | B2 * | 8/2007 | Yeager et al. ............... 709/203 |
| 7,412,501 | B2 * | 8/2008 | Sanghvi et al. ............. 709/223 |
| 2005/0235055 | A1 * | 10/2005 | Davidson ..................... 709/223 |

OTHER PUBLICATIONS

PCI-SIG, PCI Firmware Specification, Revision 3.0, Jun. 20, 2005, pp. 1-94.
Distributed Management Task Force, Inc., "Server Management Command Line Protocol Specification (SM CLP) Version 1.0," Jun. 7, 2005, pp. 1-241.

* cited by examiner

*Primary Examiner* — Jerry Dennison

(57) ABSTRACT

A distributed managed system including targets, clients, and a management processor. Each client is adapted to originate commands with at least some commands having a desired destination of one or more targets. The management processor is adapted to receive commands originated by the clients and generate a context value for each received command having a desired destination. The context value indicates a particular client that originated the command. The management processor adds the context value to each corresponding command to create commands with context and dispatches commands with context to the desired destination. At least one target is adapted to receive the commands with context, interpret the context value to identify the particular client that originated the command, and process the commands with context.

25 Claims, 10 Drawing Sheets

DISTRIBUTED MANAGED SYSTEM, SYSTEM COMPONENTS, AND METHODS OF COMMUNICATING COMMANDS

BACKGROUND

Dispatching commands from clients to targets may be accomplished through a centralized management processor (MP). Each target includes certain multi-user and multi-tasking capabilities. These capabilities can be configured and re-configured from time-to-time either manually, automatically, or semi-automatically. Currently, the intelligence for applying multi-user and multi-tasking policies for targets for processing of commands by targets is centralized in the MP. This requires a high degree of complexity because the centralized intelligence has to understand multi-user and multi-tasking policies for many different targets. This also severely limits flexibility because many targets may be forced to use common or hybrid multi-user or multi-tasking policies that are not optimized for individual targets. Also, any time a new target, a new multi-user policy, or a new multi-tasking policy is introduced, the intelligence in the centralized MP may need to be updated. These existing solutions result in high cost MPs that are also costly to maintain as existing targets are updated and new targets are introduced.

SUMMARY

In one aspect, a method of communicating commands in a distributed managed system is provided. In one embodiment, the method includes: a) receiving commands originating from a plurality of clients at a management processor, at least some commands having a desired destination of one or more targets, b) generating a context value for each received command having a desired destination of the one or more targets, the context value indicating a particular client originating a corresponding command, c) adding the context value to each corresponding command to create corresponding commands with context, and d) dispatching each command with context to a corresponding desired destination.

DESCRIPTION OF EMBODIMENTS

Figure 1:
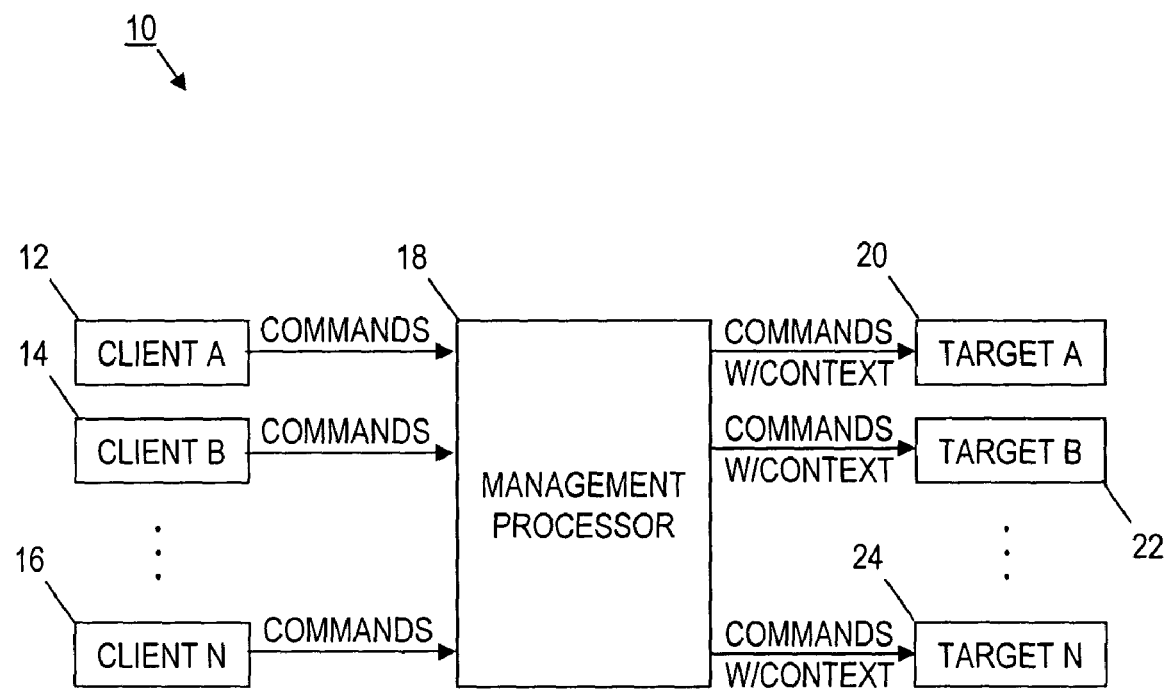
FIG. 1 is a block diagram of an embodiment of a distributed managed system.

The following includes definitions of exemplary terms used herein. Both singular and plural forms of all terms fall within each meaning.

"Target" as used herein includes, but is not limited to, a managed element, such as a peripheral device, operating system service, or application program, that receives commands from one or more clients and processes (or chooses not to process) the commands. A target may include intelligence for processing the commands according to certain predetermined multi-user/multi-tasking policies.

"Client" as used herein includes, but is not limited to, a managing entity, such as a station or service, that may originate commands directed to a desired destination of one or more targets and transmits such commands to an MP for dispatching to the desired destination.

"Management processor (MP)" as used herein includes, but is not limited to, a centralized management access point for receiving commands from multiple clients and distributing the commands to one or more of multiple targets. An MP may include intelligence for implementing multi-user/multi-tasking policies associated with the corresponding target when distributing a given command.

"Command" as used herein includes, but is not limited to, an individual command line instruction, a sequence of commands provided as individual command line instructions, and a sequence of commands provided in a script file originating from a client and communicated to an MP. Commands may query or control some aspect of one or more targets.

"Command with context" as used herein includes, but is not limited to, a combination of a command and a context value. The context value is generated by an MP and indicates a particular client that originated the command. The context value is added to the command by the MP and the combination is dispatched to one or more targets.

"Multi-user policy" as used herein includes, but is not limited to, a rule or algorithm by which a given target may process multiple commands originated by more than one client.

"Multi-tasking policy" as used herein includes, but is not limited to, a rule or algorithm by which a given target may process multiple commands originated by the same client.

In general, a method of dispatching commands, including stateless commands, from multiple clients to one or more targets is provided via a distributed managed system. In the distributed managed system, multiple clients are connected to an MP which is also connected to multiple targets. The distributed managed system allows an individual target to decide how it will handle commands with respect to its own predetermined local multi-user and/or multi-tasking policies. This permits management of multi-user policies, multi-tasking policies, and subsequent command line processing to be distributed to an individual target instead of maintaining centralized control of these aspects at the MP. Methods of dispatching commands using the distributed managed system are simpler and more flexible than methods using centralized mechanisms within the MP.

In the distributed managed system, the intelligence of the multi-user/multi-tasking policies for one or more targets may be distributed from the centralized MP to the corresponding individual target. The centralized MP may merely serves as a command dispatcher for individual targets that have local intelligence for managing multi-user policies, multi-tasking policies, and/or subsequent command line processing. The MP does not have to understand the multi-user/multi-tasking policies for targets that include such local intelligence. This simplifies the MP and makes the distributed managed solution much more flexible than existing centrally managed solutions. Individual targets can implement their own multi-user/multi-tasking policies independent of the MP in the distributed managed system.

In a distributed managed system, a client may log in to the MP and an MP agent/dispatcher may generate a context value for that client. The MP agent/dispatcher may include hardware, software, firmware, or any combination thereof. The MP agent/dispatcher may be part of the MP or may be acting on behalf of an MP that manages client connections and receives commands. The context value may include a data field capable of uniquely identifying the client that originated the corresponding command. An example of a context data field is a unique 16-bit integer.

When the MP agent/dispatcher receives commands from a client, it may stamp the command with the generated context value to create a corresponding command with context. The MP agent/dispatcher may forward the command with context to one or more desired targets. The desired target may include an agent that receives the command. The agent may include hardware, software, firmware, or any combination thereof. The agent may be part of the target or acting on behalf of the target. When the agent receives commands, it may implement certain multi-user/multi-tasking policies to determine a priority and sequence for handling or processing the command. Where the agent includes intelligence to implement multi-user/multi-tasking policies for the target, the MP does not need to include intelligence associated with these policies and merely dispatches the command to the desired target. This is much simpler than existing centralized techniques in which the MP implements multi-user/multi-tasking policies for all targets in the system. This is also more flexible since each target may implement its own unique multi-user/multi-tasking policies.

The distributed managed system simplifies the command dispatcher function in the MP in comparison to existing solutions. The complex centralized multi-user/multi-tasking logic of previous solutions is divided up and distributed to individual targets. The multi-user/multi-tasking logic for individual targets is simplified and streamlined because it is tailored to the corresponding target. For individual targets that include multi-user/multi-tasking logic, the MP simply stamps commands with a context and passes them on to the specified targets. Then, the individual targets can implement multi-user/multi-tasking policies independent of the MP. In this distributed managed arrangement, multiple targets of the same type that are connected to the same MP can choose to implement different policies without involving the MP. Moreover, if a new multi-user/multi-tasking policy is added, it can be implemented in the target without modifying or upgrading the MP.

With reference to FIG. 1, an embodiment of a distributed management system 10 includes a plurality of clients represented by client A 12, client B 14, and client N 16, an MP 18 in communication with the plurality of clients, and a plurality of targets represented by target A 20, target B 22, and target N 24 in communication with the MP 18. Each client is adapted to originate one or more commands. The commands may be based on any type of command line interface (CLI) standard or Web-based enterprise management (WBEM) standard. Any corresponding command syntax may be implemented. At least some commands have a desired destination of one or more of the targets. Commands may include the desired destination or the desired destination may be recognized by the MP 18 from the command itself. For example, certain commands may be directed to all targets or to a particular class or group of targets. Target classes or groups may be incorporated in the command syntax or may be defined within the MP 18. Some commands may not necessarily be destined for a target. For example, certain commands may be used to query or control the MP 18. At least a portion of the commands may be stateless commands. Similarly, at least a portion of the commands may be autonomous commands. Of course, all commands may be stateless or autonomous commands.

The MP 18 is adapted to receive commands originated by the clients. The MP 18 generates a context value for each received command having a desired destination of one or more targets. The context value indicates a particular client that originated the corresponding command. The context value may include one or more parameters capable of uniquely identifying the client that originated the corresponding command. For example, the context value may include a client identifier parameter and a user parameter. The client identifier parameter may represent a particular instance of a certain type of client in the system. The user parameter may represent a particular user or a class of users and the associated user privileges.

The MP 18 adds the context value to each corresponding command to create corresponding commands with context. The original command may be encapsulated by a wrapper carrying the context value. Alternatively, the context value may be appended to precede the original command or appended to follow the original command in the command with context. In another alternative, the command with context may be formed by adding the context value to the original command as a parameter reserved for context values or as a parameter reserved for user-defined parameters in the standard command syntax. After each command with context is created, the MP 18 dispatches it to the desired destination.

At least one of the plurality of targets is adapted to receive commands with context from the MP 18. Even though all of the targets in FIG. 1 are shown receiving commands with context, some of the plurality of targets may implement a scheme for queries and control that uses other types of communications instead of the commands with context. Each target adapted to receive commands with context interprets the context value in the received commands with context to identify the particular client that originated the corresponding commands with context. Then, each target may determine a priority and sequence for processing the received commands with context using multi-user/multi-tasking policies. The determined priority and sequence may be based at least in part on the context value associated with the corresponding commands with context. Finally, each target processes the received commands with context. If implemented, processing is according to the priority and sequence determined by the target. Otherwise, processing may be according to priority and sequence determined, for example, by the MP 18.

A first example of a multi-user policy for a given target may be to accept all commands with context at all times.

A second example of a multi-user policy for a given target may be to accept commands with context having a particular context value until a predetermined timeout period elapses after receipt of a last command with context having the particular context value. Commands with context having a context value different than the particular context value that are received by the given target may be rejected when the second multi-user policy is active. Alternatively, commands with context having a context value different than the particular context value that are received by the given target may be stored in a queue when the second multi-user policy is active and processed after the second multi-user policy is inactive.

At least one client may also be adapted to originate lock commands and corresponding subsequent unlock commands having a desired destination of one or more targets adapted to receive commands with context. A third example of a multi-user policy for a given target may be to accept commands with context having a particular context value associate with the at least one client after a lock command with context from the at least one client is received and until an unlock command with context from the at least one client is received. Commands with context having a context value different than the particular context value associated with the at least one client that are received by the given target may be rejected when the third multi-user policy is active for the at least one client. Alternatively, commands with context having a context value different than the particular context value associated with the at least one client that are received by the given target may be stored in a queue when the third multi-user policy is active for the at least one client and processed after the third multi-user policy is inactive for the at least one client.

A first example of a multi-tasking policy for a given target may be to accept all commands with context having a particular context value without delay. This is commonly referred to as a re-entrant multi-tasking policy.

A second example of a multi-tasking policy for a given target may be to queue commands with context having a particular context value until the preceding command with context having the particular context value is processed. In contrast to the first example, this multi-tasking policy is not re-entrant.

At least one client may also be adapted to originate a login command to the MP 18. If so, the MP 18 is also adapted to respond to receiving the login command by performing a login process to properly log in the corresponding client prior to authorizing the generation of a context value for each received command having a desired destination of one or more targets from the corresponding client.

Figure 2:
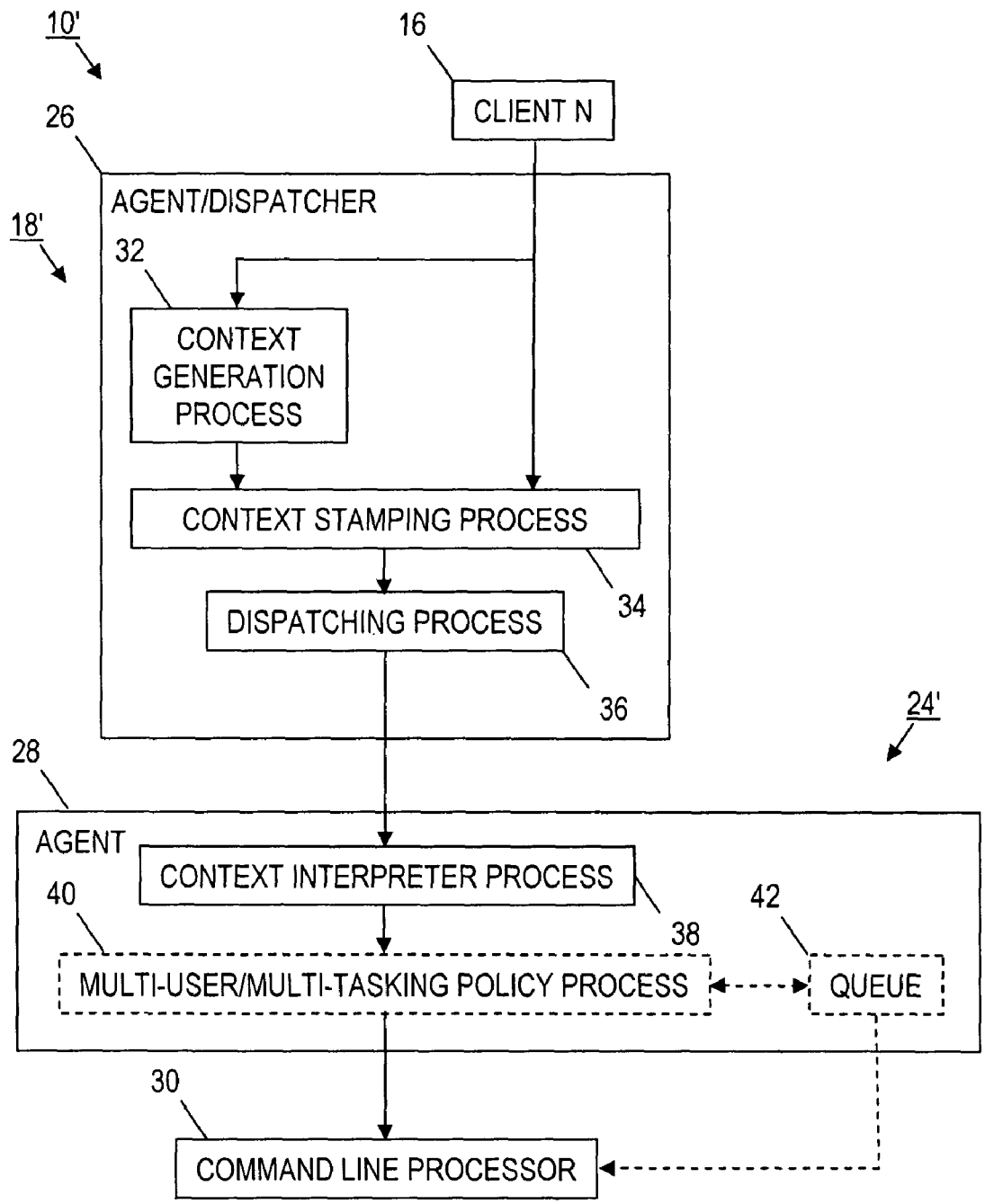
FIG. 2 is a block diagram showing an embodiment of a management processor (MP) and an embodiment of a target in a distributed managed system.

With reference to FIG. 2, an embodiment of a distributed managed system 10' includes client N 16, an MP 18' in communication with client N 16, and a target N 24' in communication with the MP 18'. As in FIG. 1, the MP 18' may be in communication with a plurality of clients and/or a plurality of targets may be in communication with the MP 18'. Generally, client N 16, MP 18', and target N 24' operate in the same manner as described above with reference to FIG. 1 and may include the various options and features described above in any combination. For example, client N 16 is adapted to originate one or more commands and at least some commands have a desired destination of one or more targets, including target N 24'.

The MP 18' includes an agent/dispatcher 26. The agent/dispatcher 26 is adapted to receive commands originated by client N 16 and to dispatch commands with context to target N 24'. It is understood that the agent/dispatcher 26 may also receive commands originated by other clients and may also dispatch commands with context to other targets. Target N 24' includes an agent 28 and a command line processor 30 in communication with the agent 28. The agent 28 is adapted to receive commands with context from the MP 18'. The command line processor 30 processes the received commands with context.

The agent/dispatcher 26 includes a context generation process 32, a context stamping process 34 in communication with both the context generation process 32, and a dispatching process 36 in communication with the context stamping process 34. The context generation process 32 is adapted to receive commands originated by one or more clients and generates a context value for each received command having a desired destination of one or more targets. The context stamping process 34 is also adapted to receive commands from one or more clients and adds the context value to each corresponding command to create corresponding commands with context. After each command with context is created, the dispatching process 36 dispatches it to the desired destination.

The agent 28 includes a context interpreter process 38 and may include a multi-user/multi-tasking policy process 40 in communication with the context interpreter process 38. The agent 28 may also include a queue 42 in communication with both the multi-user/multi-tasking policy process 40 and the command line processor 30. The context interpreter process 38 is adapted to receive commands with context from the dispatching process 36 and interprets the context value in each received command with context to identify the particular client that originated the corresponding command with context. Then, if implemented, the multi-user/multi-tasking policy process 40 determines a priority and sequence for processing the received commands with context using multi-user/multi-tasking policies. The multi-user/multi-tasking policies, for example, may include the multi-user policies and multi-tasking policies described above in reference to FIG. 1. Moreover, also as described above, the determined priority and sequence is based at least in part on the context value associated with the corresponding commands with context. Finally, the command line processor 30 processes the received commands with context. If the optional multi-user/multi-tasking policy process 40 is included, processing is according to the determined priority and sequence. Otherwise, processing may be according to priority and sequence determined, for example, by the MP 18'.

When the queue 42 is implemented, the queue 42 may be used to store commands with context having a context value different than the particular context value of commands that are accepted for processing when the second or third examples of multi-user policies are active. After these multi-user policies are inactive, the queued commands with context may be processed by the command line processor 30. Similarly, when the second example of multi-tasking policies is active, the queue 42 may also be used to store commands with context that have a particular context value until the preceding command with context having the particular context value is processed.

Figure 3:
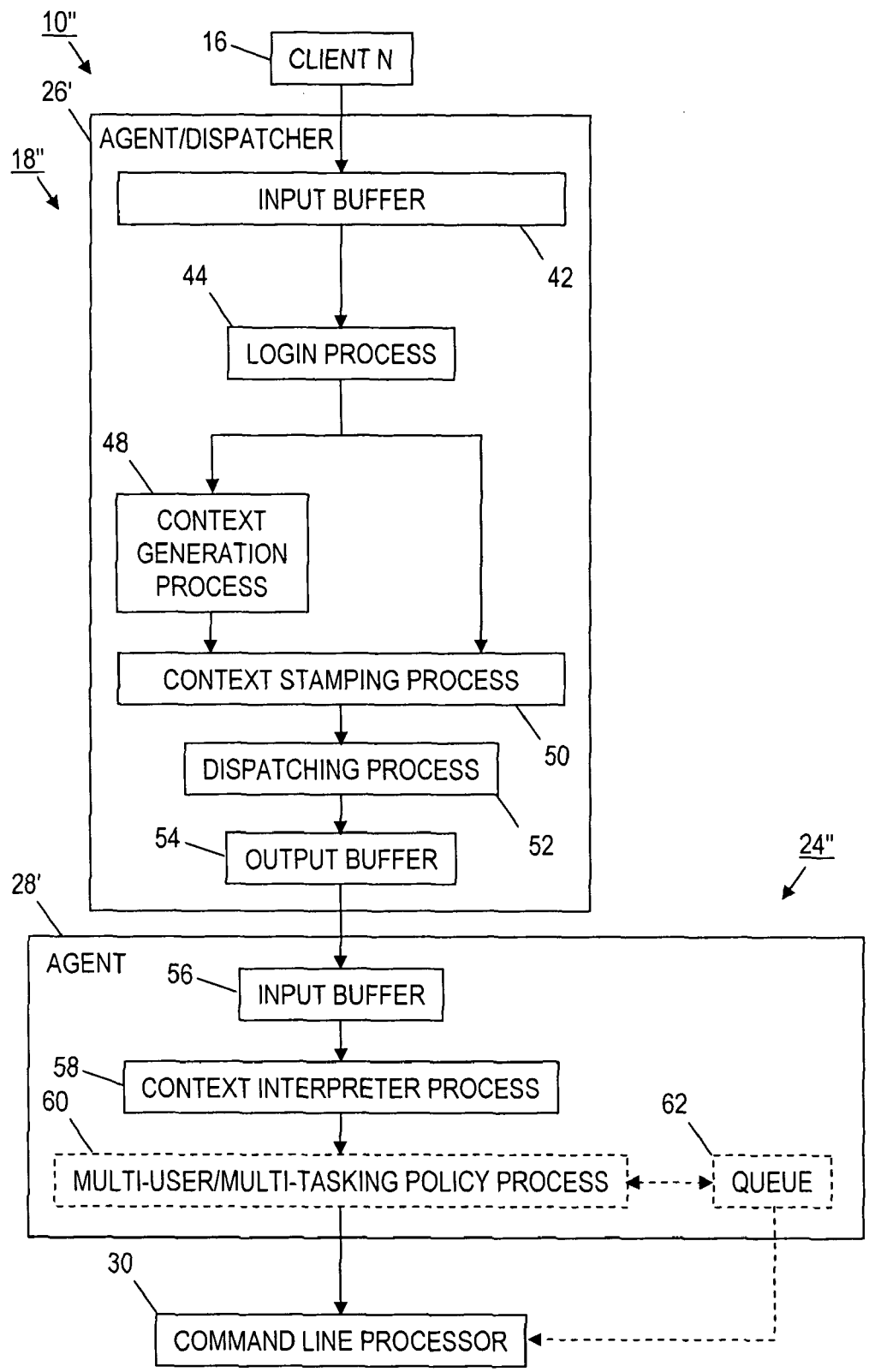
FIG. 3 is a block diagram showing another embodiment of an MP and another embodiment of a target in a distributed managed system.

With reference to FIG. 3, an embodiment of a distributed managed system 10'' includes client N 16, an MP 18'' in communication with client N 16, and target N 24'' in communication with the MP 18''. As in FIG. 1, the MP 18'' may be in communication with a plurality of clients and/or a plurality of targets. Generally, client N 16, MP 18'', and target N 24'' operate in the same manner as described above with reference to FIG. 1 and may include the various options and features described above in any combination. For example, client N 16 is adapted to originate one or more commands and at least some commands have a desired destination of one or more targets, including target N 24''. Client N 16 is also adapted to originate a login command to log in at the MP 18''.

The MP 18'' includes an agent/dispatcher 26'. Like in FIG. 2, the agent/dispatcher 26' is adapted to receive commands originated by client N 16 and to dispatch commands with context to target N 24". It is understood that the agent/dispatcher 26' may also receive commands originated by other clients and may also dispatch commands with context to other targets. Target N 24" includes an agent 28' and a command line processor 30. Like in FIG. 2, the agent 28' is adapted to receive commands with context from the MP 18". The command line processor 30 processes the received commands with context.

The agent/dispatcher 26' includes an input buffer 42, a login process 44 in communication with the input buffer 42, a context generation process 48 in communication with the login process 44, a context stamping process 50 in communication with both the login process 44 and the context generation process 48, a dispatching process 52 in communication with the context stamping process 50, and an output buffer 54 in communication with the dispatching process 52. The input buffer 42 is adapted to receive commands originated by one or more clients and may temporarily store the received commands. The login process 44 responds to receiving a login command from a client and performs a login process to properly log in the corresponding client. The login process 44 may include verification that a user identification and password combination associated with the login command are valid. Once the login process 44 is satisfactorily completed, commands having a desired destination of one or more targets from the corresponding client are passed to the context generation process 32. The context generation process 32 generates a context value for each received command having a desired destination of one or more targets. The context stamping process 34 adds the context value to each corresponding command to create corresponding commands with context. After each command with context is created, the dispatching process 36 dispatches it to the desired destination via the output buffer 54. The output buffer 54 may temporarily store the commands with context.

The agent 28' includes an input buffer 56, a context interpreter process 58 in communication with the input buffer 56, and, optionally, may include a multi-user/multi-tasking policy process 60 in communication with the context interpreter process 58. The agent 28' may also include a queue 62 in communication with both the multi-user/multi-tasking policy process 60 and the command line processor 30. The input buffer 56 is adapted to receive commands with context from the output buffer 54 and may temporarily store the commands with context. The context interpreter process 58 interprets the context value in each received command with context to identify the particular client that originated the corresponding command with context. Then, if implemented, the multi-user/multi-tasking policy process 60 determines a priority and sequence for processing the received commands with context using multi-user/multi-tasking policies. The multi-user/multi-tasking policies, for example, may include the multi-user policies and multi-tasking policies described above in reference to FIG. 1. Moreover, also as described above, the determined priority and sequence is based at least in part on the context value associated with the corresponding commands with context. Finally, the command line processor 30 processes the received commands with context. If the optional multi-user/multi-tasking policy process 60 is included, processing is according to the determined priority and sequence. Otherwise, processing may be according to priority and sequence determined, for example, by the MP 18".

When the queue 62 is implemented, the queue 62 may be used to store commands with context having a context value different than the particular context value of commands that are accepted for processing when the second or third examples of multi-user policies are active. After these multi-user policies are inactive, the queued commands with context may be processed by the command line processor 30. Similarly, when the second example of multi-tasking policies is active, the queue 62 may also be used to store commands with context that have a particular context value until the preceding command with context having the particular context value is processed.

Figure 4:
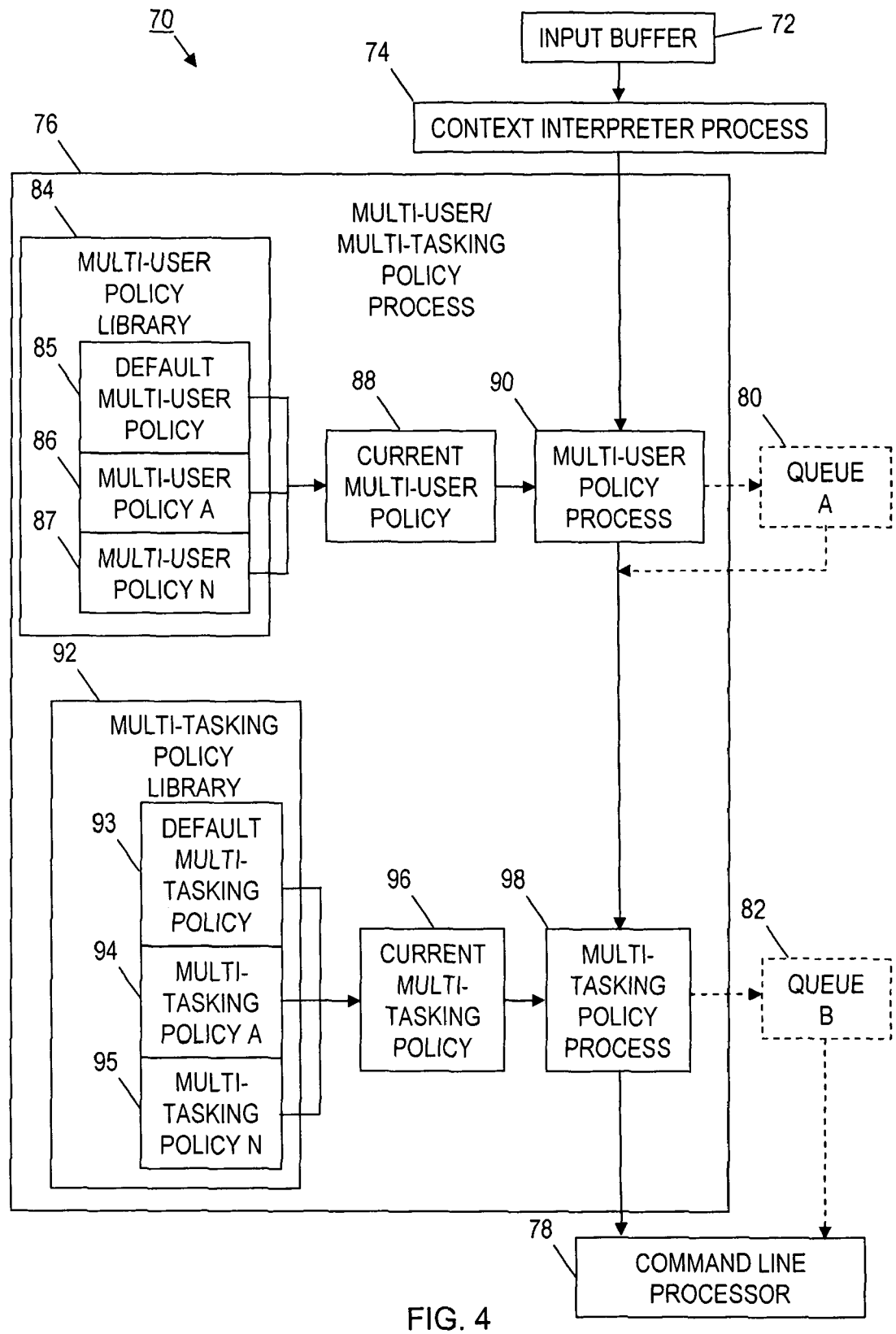
FIG. 4 is a block diagram showing an embodiment of a multi-user/multi-tasking policy process in an agent of a target associated with a distributed managed system.

With reference to FIG. 4, an embodiment of an agent 70 in a target includes an input buffer 72, a context interpreter process 74 in communication with the input buffer 72, an optional multi-user/multi-tasking policy process 76 in communication with the context interpreter process 74, and a command line processor 78 in communication with the multi-user/multi-tasking policy process 76. The agent 70 may also include a queue A 80 in communication with the multi-user/multi-tasking policy process 76 and/or a queue B 82 in communication with both the multi-user/multi-tasking policy process 76 and the command line processor 78.

If implemented, the multi-user/multi-tasking policy process 76 may include a multi-user policy library 84 storing a plurality of multi-user policies, such as a default multi-user policy 85, a multi-user policy A 86, and a multi-user policy N 87, a current multi-user policy 88 in communication with the multi-user policy library 84, and a multi-user policy process 90 in communication with both the current multi-user policy 88 and the context interpreter process 74. The multi-user/multi-tasking policy process 60 may also include a multi-tasking policy library 92 storing a plurality of multi-tasking policies, such as a default multi-tasking policy 93, a multi-tasking policy A 94, and a multi-tasking policy N 95, a current multi-tasking policy 96 in communication with the multi-tasking policy library 92, and a multi-tasking policy process 99 in communication with both the multi-user policy process 90 and the command line processor 78.

The input buffer 72 is adapted to receive commands with context from an output buffer (e.g., see FIG. 3, 54) and may temporarily store the commands with context. The context interpreter process 74 interprets the context value in each received command with context to identify the particular client that originated the corresponding command with context. Then, the multi-user policy process 90 and the multi-tasking policy process 98 determines a priority and sequence for processing the received commands with context. The multi-user policy process 90 uses the current multi-user policy 88 selected for the particular client. The current multi-user policy 88 may be the default multi-user policy 85 or any other pre-selected multi-user policy from the multi-user policy library 84. The multi-tasking policy process 98 uses the current multi-tasking policy 96 selected for the particular client. The current multi-tasking policy 96 may be the default multi-tasking policy 93 or any other pre-selected multi-tasking policy from the multi-tasking policy library 92. The multi-user/multi-tasking policies, for example, may include the multi-user policies and multi-tasking policies described above in reference to FIG. 1. Finally, the command line processor 78 processes the received commands with context. If the optional multi-user/multi-tasking policy process 76 is included, processing is according to the determined priority and sequence. Otherwise, processing may be according to priority and sequence determined, for example, by an MP (e.g., 18, FIG. 1).

When queue A 80 is implemented, queue A 80 may be used to store commands with context having a context value different than the particular context value of commands that are accepted for processing when, for example, the second or third examples of multi-user policies are active. After these multi-user policies are inactive, the queued commands with context may be forwarded on to the multi-tasking policy process 98 for continued determination of priority and sequence for the commands with context. Similarly, when queue B 82 is implemented and when, for example, the second example of multi-tasking policies is active, queue B 82 may be used to store commands with context that have a particular context value until the preceding command with context having the particular context value is processed.

Figure 5:
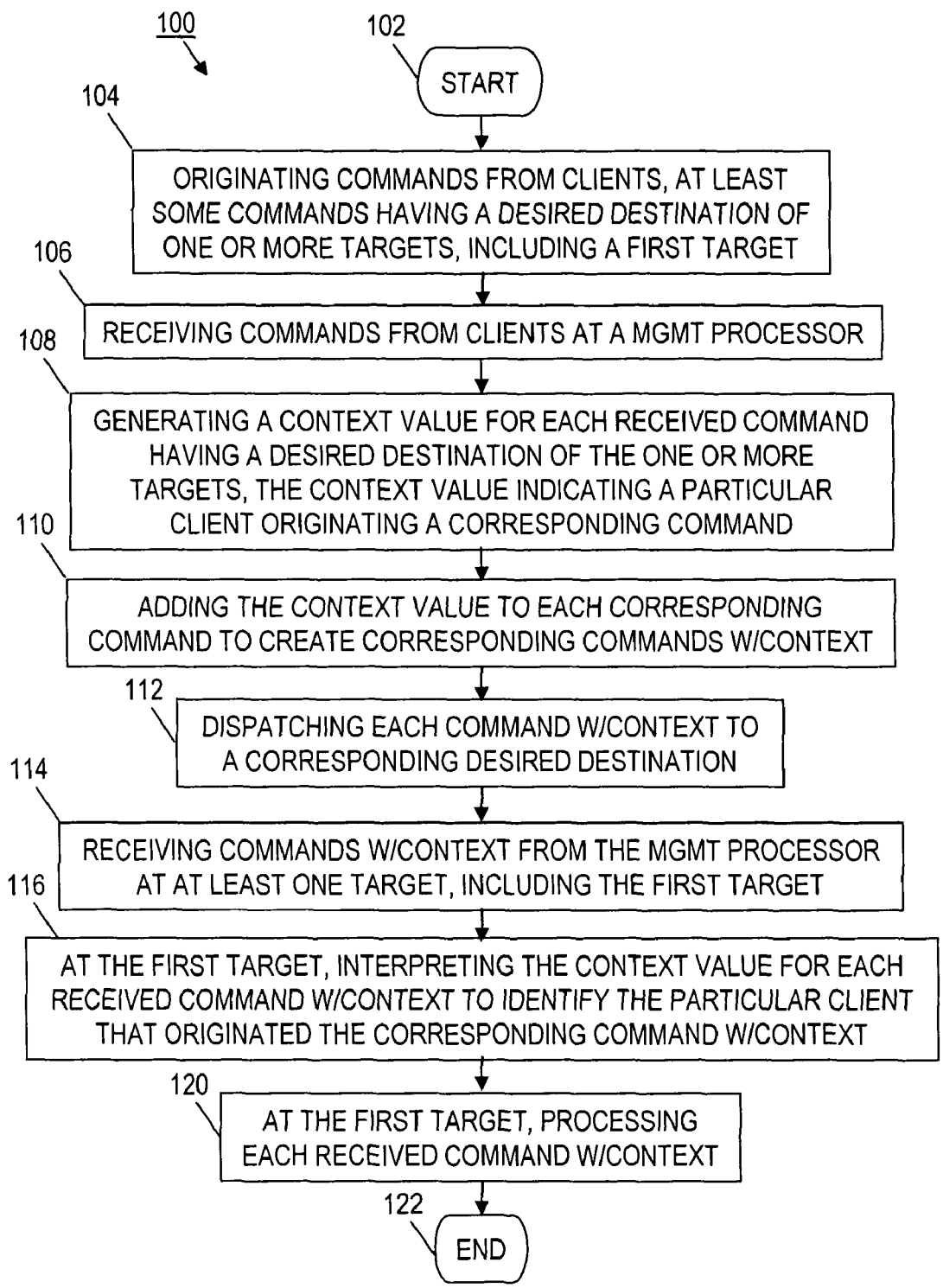
FIG. 5 is a flow chart of an embodiment of a process for communicating commands in a distributed managed system.

With reference to FIG. 5, an embodiment of a process 100 for communicating commands in a distributed managed system begins at 102. Initially, at 104, at least some commands having a desired destination of one or more targets, including a first target, are originated from a plurality of clients. At 106, the commands from the plurality of clients are received at an MP. At 108, the MP generates a context value for each received command having a desired destination of the one or more targets. The context value indicates a particular client that originated a corresponding command. At 110, the MP adds the context value to each corresponding command to create corresponding commands with context. At 112, the MP dispatches each command with context to a corresponding desired destination.

At 114, at least one target, including the first target, receives commands with context from the MP. At 116, the first target interprets the context value for each received command with context to identify the particular client that originated the corresponding command with context. At 120, the first target processes each received command with context. At 122, the process has reached its end. Between 116 and 120, the first target may determine a priority and sequence for processing the received commands with context using multi-user/multi-tasking policies. The determined priority and sequence may be based at least in part on the context value associated with the corresponding commands with context. If the first target determines priority and sequence, it processes each received command with context according to the determined priority and sequence.

In one embodiment, the process 100 may include originating login commands from at least one client at 104 and receiving login commands from the at least one client at the MP at 106. The MP may respond to receiving a login command from each at least one client by performing a login process to properly log in the corresponding client prior to authorizing the generating of a context value at 108 for each received command having a desired destination of one or more targets from the corresponding client.

In one embodiment, the first target may use a first multi-user policy at 118 to accept all commands with context at all times.

In another embodiment, the first target may use a second multi-user policy at 118 to accept commands with context having a particular context value until a predetermined timeout period elapses after receipt of a last command with context having the particular context value. In any embodiment including the second multi-user policy, the first target may reject commands with context having a context value different than the particular context value when the second multi-user policy is active. Alternatively, in any such embodiment, the first target may store commands with context having a context value different than the particular context value in a queue when the second multi-user policy is active and may process the commands with context stored in the queue after the second multi-user policy is inactive.

In still another embodiment, at least one client is also adapted to originate lock commands and corresponding subsequent unlock commands having a desired destination of the at least one target, including the first target, at 104. In the embodiment being described, the first target may use a third multi-user policy at 118 to accept commands with context having a particular context value associated with the at least one client after a lock command with context from the at least one client is received and until an unlock command with context from the at least one client is received. In any embodiment including the third multi-user policy, the first target may reject commands with context having a context value different than the particular context value associated with the at least one client when the third multi-user policy is active for the at least one client. Alternatively, in any such embodiment, the first target may store commands with context having a context value different than the particular context value associated with the at least one client in a queue when the third multi-user policy is active for the at least one client and may process the commands with context stored in the queue after the third multi-user policy is inactive for the at least one client.

In one embodiment, the first target may use the first multi-tasking policy to accept all commands with context having a particular context value without delay.

In another embodiment, the first target may use the second multi-tasking policy to queue commands with context having a particular context value until a preceding command with context having the particular context value is processed.

Figure 6:
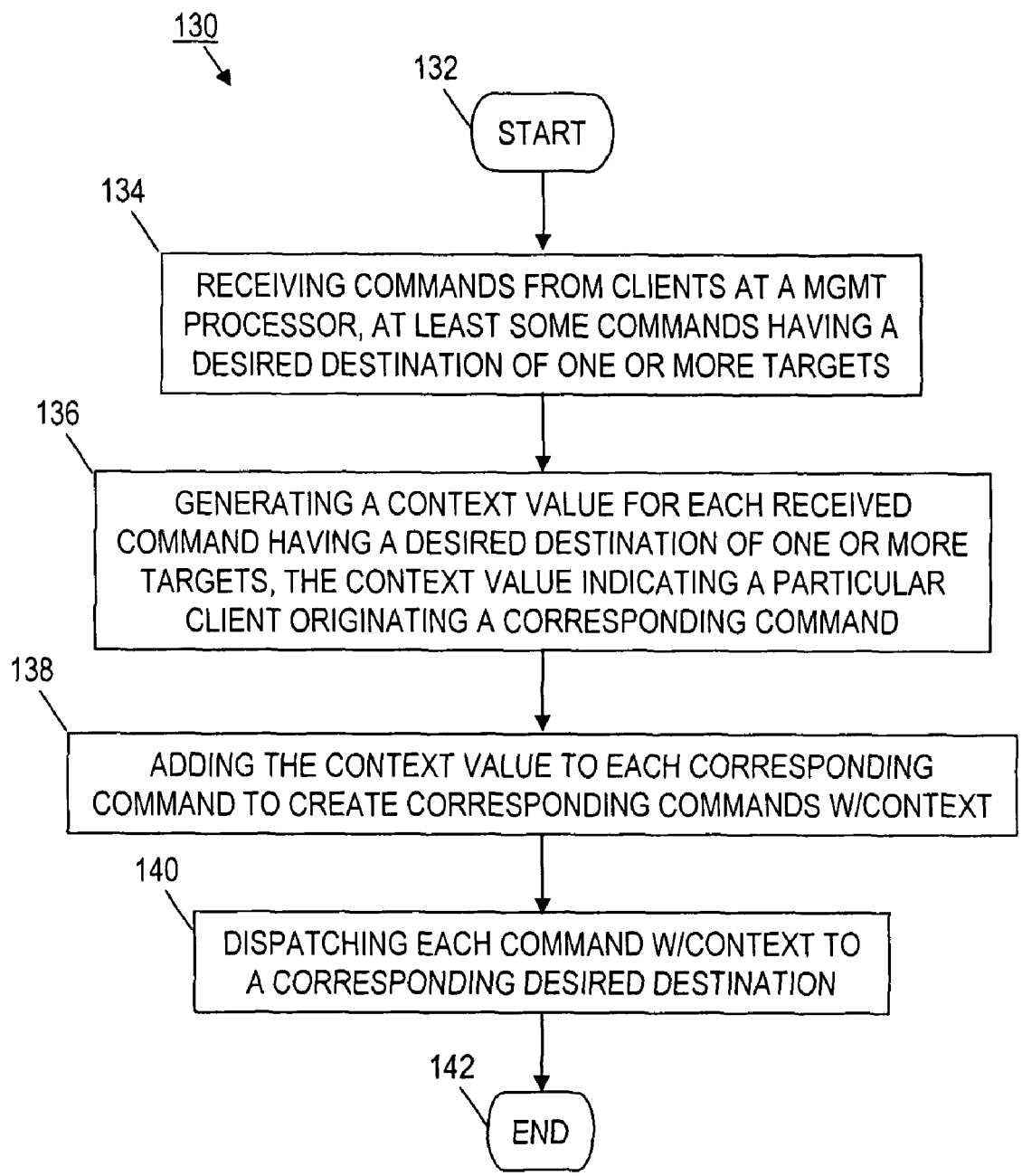
FIG. 6 is a flow chart of another embodiment of a process for communicating commands in a distributed managed system.

With reference to FIG. 6, another embodiment of a process 130 for communicating commands in a distributed managed system begins at 132. Initially, at 134, at least some commands having a desired destination of one or more targets are received from clients at an MP. At 136, the MP generates a context value for each received command having a desired destination of the one or more targets. The context value indicates a particular client that originated a corresponding command. At 138, the MP adds the context value to each corresponding command to create corresponding commands with context. At 140, the MP dispatches each command with context to a corresponding desired destination. At 142, the process has reached its end.

Figure 7:
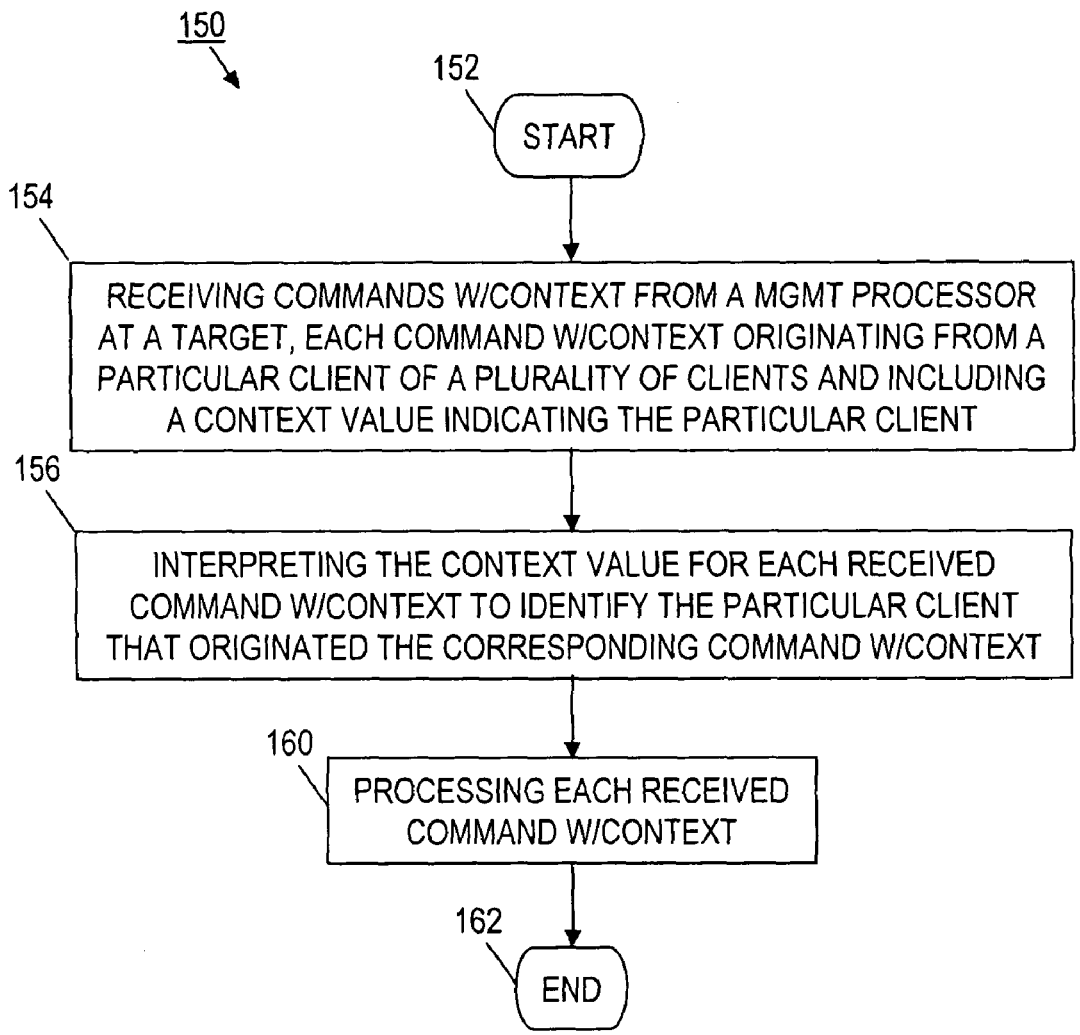
FIG. 7 is a flow chart of yet another embodiment of a process for communicating commands in a distributed managed system.

With reference to FIG. 7, still another embodiment of a process 150 for communicating commands in a distributed managed system begins at 152. Initially, at 154, a target receives commands with context from an MP. Each command with context originating from a particular client of a plurality of clients and including a context value indicating the particular client. At 156, the target interprets the context value for each received command with context to identify the particular client that originated the corresponding command with context. At 160, the target processes each received command with context. At 162, the process has reached its end. Between 156 and 160, a priority and sequence for processing the received commands with context using multi-user/multi-tasking policies may be determined. The determined priority and sequence may be based at least in part on the context value associated with the corresponding commands with context. If the priority and sequence is determined, each received command with context is processed according to the determined priority and sequence.

Figure 8:
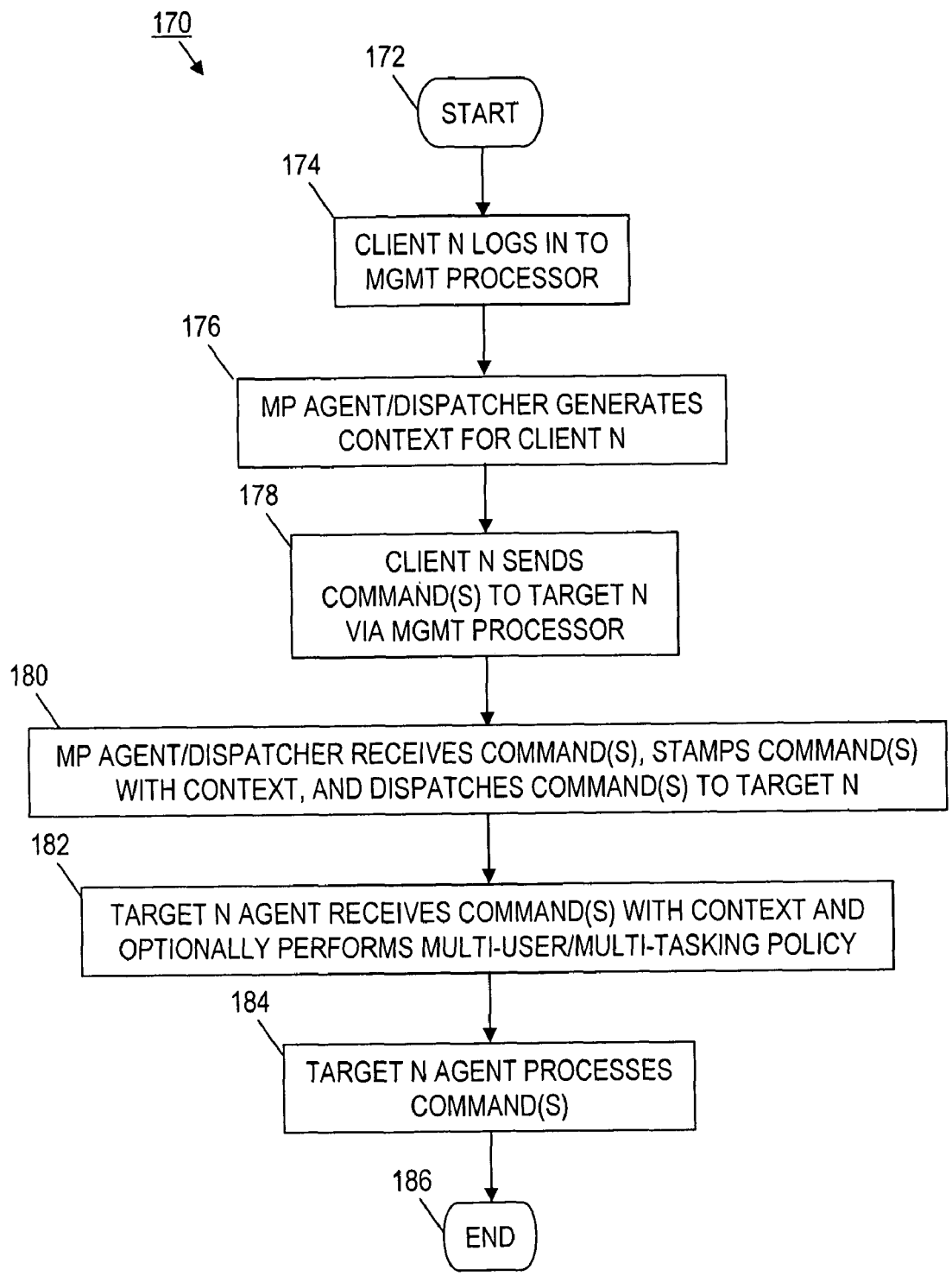
FIG. 8 is a flow chart of still another embodiment of a process for communicating commands in a distributed managed system.

With reference to FIG. 8, yet another embodiment of a process 170 for communicating commands in a distributed managed system begins at 172. Initially, at 174, client N logs in to an MP. At 176, an MP agent/dispatcher generates a context value for client N. At 178, client N sends one or more commands to target N via the MP. At 180, the MP agent/dispatcher receives the one or more commands destined for target N, stamps the one or more commands with the context value for client N to create corresponding commands with context, and dispatches each corresponding command with context to target N. At 182, a target N agent receives the commands with context and optionally may perform a multi-user/multi-tasking policy to determine a priority and sequence for processing the received commands with context. At 184, the target N agent processes each received command with context. If the target N agent determines the priority and sequence, it processes the received commands with context according to the determined priority and sequence. At 186, the process has reached its end.

Figure 9:
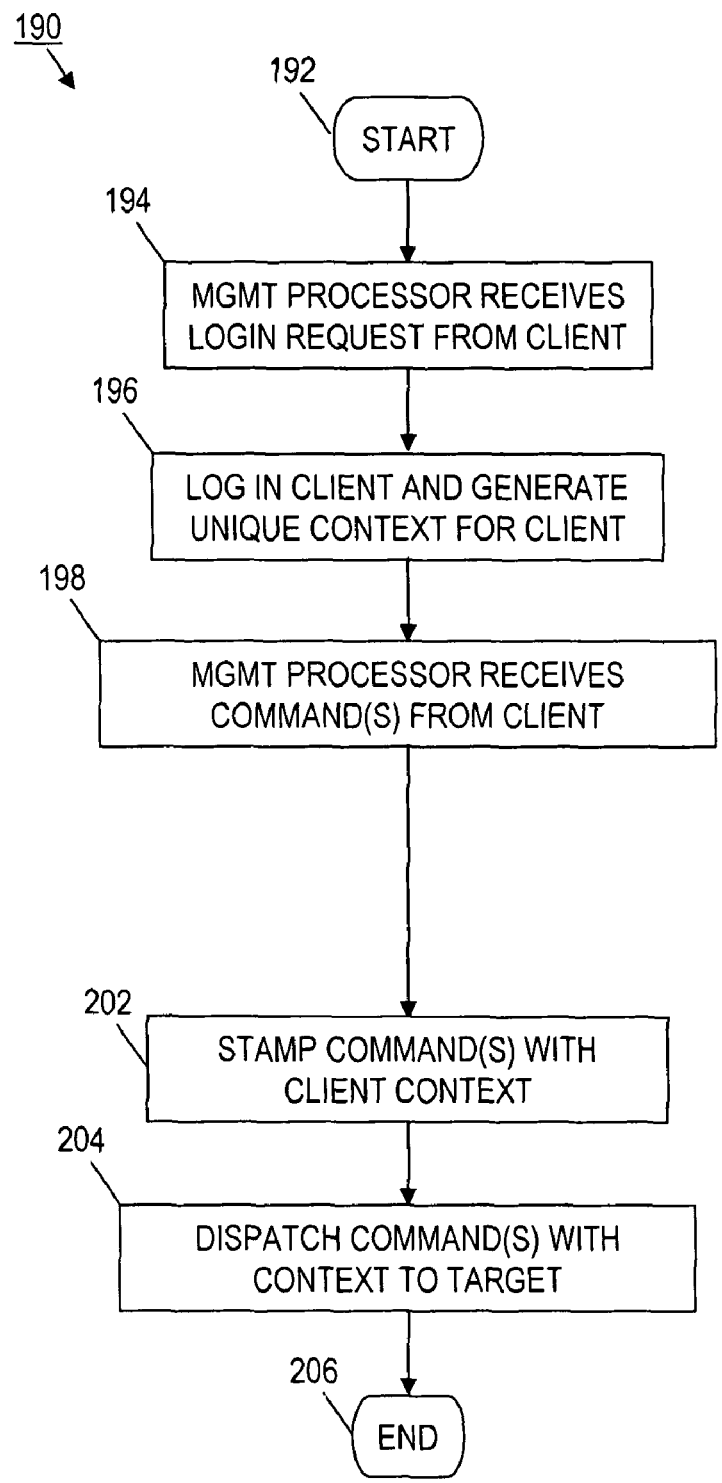
FIG. 9 is a flow chart of still yet another embodiment of a process for communicating commands in a distributed managed system.

With reference to FIG. 9, still yet another embodiment of a process 190 for communicating commands in a distributed managed system begins at 192. Initially, at 194, an MP receives a login request from a client. At 196, the MP logs in the client and generates a unique context for the client. At 198, the MP receives one or more commands having a desired destination of one or more targets. At 202, the MP stamps the one or more commands with the client context to create corresponding commands with context. At 204, the MP dispatches the corresponding commands with context to the desired destination. At 206, the process has reached its end.

Figure 10:
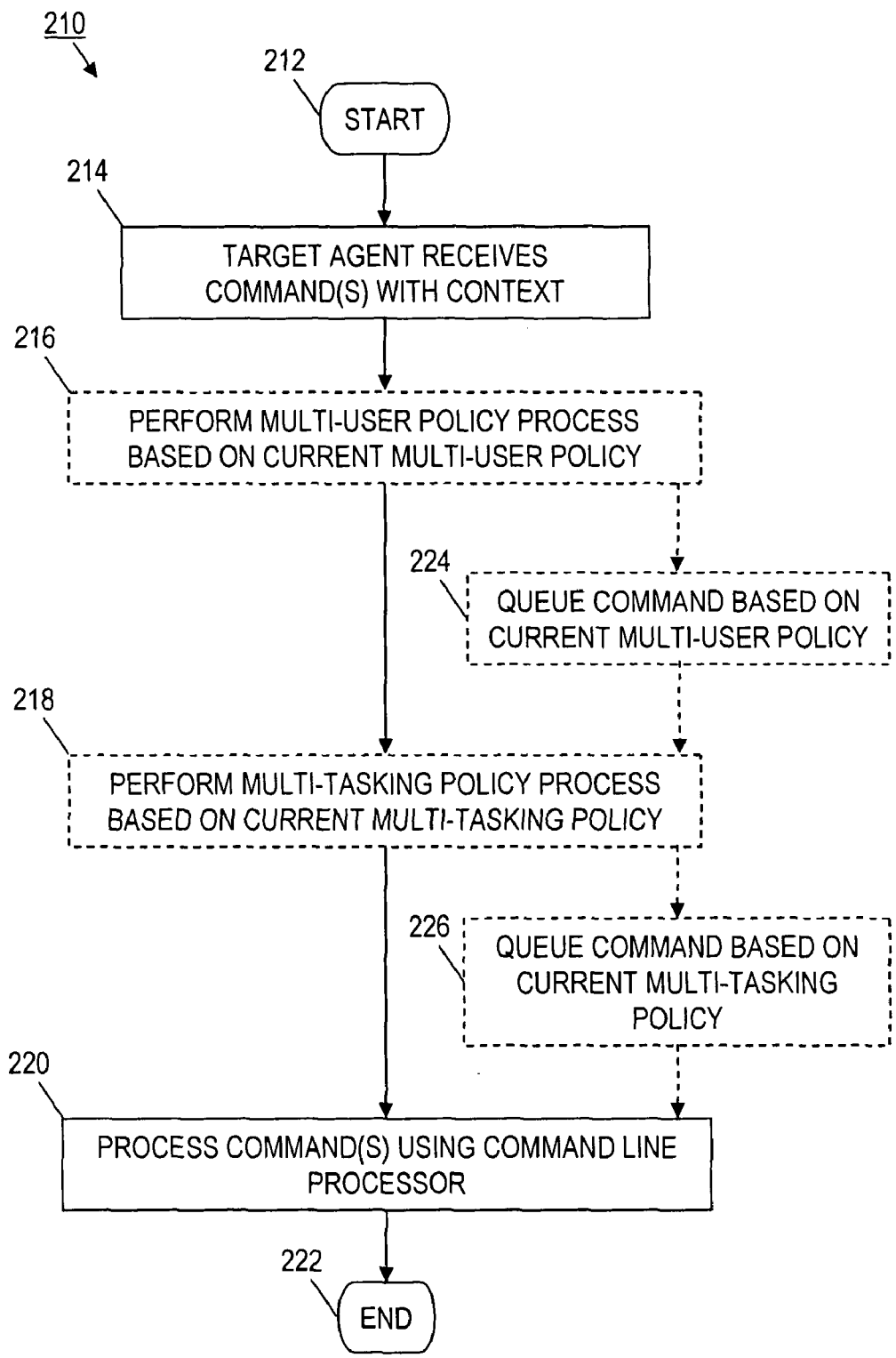
FIG. 10 is a flow chart of another embodiment of a process for communicating commands in a distributed managed system.

With reference to FIG. 10, another embodiment of a process 210 for communicating commands in a distributed managed system begins at 212. Initially, at 214, a target agent receives one or more commands with context from an MP. Each command with context originating from a particular client of a plurality of clients and including a context value indicating the particular client. At 216, the target agent may perform a multi-user policy process based on a current preselected multi-user policy to at least partially determine a priority and sequence for processing the received commands with context. This is optional, as indicated by the dashed lines for block 216. At 218, the target agent may perform a multi-tasking policy process based on a current pre-selected multi-tasking policy to at least partially determine a priority and sequence for processing the received commands with context. This is optional, as indicated by the dashed lines for block 218. If blocks 216 and/or 218 are implemented, the determined priority and sequence is based at least in part on the context value associated with the corresponding commands with context. At 220, the target processes each received command with context using a command line processor. If blocks 216 and/or 218 are implemented, the command line processor processes received commands with context according to the determined priority and sequence. At 222, the process has reached its end.

As shown at 224, the target agent may store commands with context that are not initially accepted under the current pre-selected multi-user policy in a queue. Where this option is implemented, the process 210 may continue to 218 with such commands with context after the stored commands are either accepted under the current pre-selected multi-user policy or after the current pre-selected multi-user policy is inactive.

As shown at 226, the target agent may store commands with context that are not initially accepted under the current pre-selected multi-tasking policy in a queue. Where this option is implemented, the process 210 may continue to 220 with such commands with context after the stored commands are either accepted under the current pre-selected multi-tasking policy or after the current pre-selected multi-tasking policy is inactive.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. For example, components and circuitry can be changed without changing the substantive functions performed by the components and circuitry described herein. Therefore, the inventive concept, in its broader aspects, is not limited to the specific details, the representative apparatus, and illustrative examples shown and described. Accordingly, departures may be made from such details without departing from the spirit or scope of the applicant's general inventive concept.

What is claimed is:

1. A distributed managed system, including:
a plurality of targets, including a first target;
a plurality of clients, each client adapted to originate one or more commands, at least some commands having a desired destination of one or more targets, including the first target; and
a management processor adapted to receive commands originated by the plurality of clients and generate a context value for each received command having a desired destination of one or more targets, the context value indicating a particular client that originated a corresponding command;
wherein the management processor adds the context value to each corresponding command to create corresponding commands with context and dispatches each command with context to the desired destination;
wherein at least one target, including the first target, is adapted to receive commands with context from the management processor, interpret the context value in each received command with context to identify the particular client that originated the corresponding command with context, determine a priority and sequence for processing the received commands with context using multi-user/multi-tasking policies, the determined priority and sequence based at least in part on the context value associated with the corresponding commands with context, and process the received commands with context according to the determined priority and sequence, and targets include intelligence that processes and implements the received commands with context using multi-user/multi-tasking policies so management and command line processing of the commands are distributed to the targets instead of the management processor.

2. The distributed managed system of claim 1 wherein the management processor does not include intelligence to process the multi-user/multi-tasking policies since the targets implement the multi-user/multi-tasking policies independent of the management processor.

3. The distributed managed system of claim 1 wherein at least a portion of the commands are autonomous commands.

4. The distributed managed system of claim 1 wherein at least one client is also adapted to originate a login command to the management processor, wherein the management processor is also adapted to respond to receiving a login command from each at least one client by performing a login process to properly log in the corresponding client prior to authorizing the generation of a context value for each received command having a desired destination of one or more targets from the corresponding client.

5. The distributed managed system of claim 1 wherein the multi-user/multi-tasking policies for the first target include a first multi-user policy to accept all commands with context at all times.

6. The distributed managed system of claim 1 wherein the multi-user/multi-tasking policies for the first target include a second multi-user policy to accept commands with context having a particular context value until a predetermined timeout period elapses after receipt of a last command with context having the particular context value.

7. The distributed managed system of claim 1 wherein at least one client is also adapted to originate lock commands and corresponding subsequent unlock commands having a desired destination of the at least one target, including the first target, wherein the multi-user/multi-tasking policies for the first target include a third multi-user policy to accept commands with context having a particular context value associated with the at least one client after a lock command with context from the at least one client is received and until an unlock command with context from the at least one client is received.

8. The distributed managed system of claim 1 wherein the multi-user/multi-tasking policies for the first target include a first multi-tasking policy to accept all commands with context having a particular context value without delay.

9. The distributed managed system of claim 1 wherein the multi-user/multi-tasking policies for the first target include a second multi-tasking policy to queue commands with context having a particular context value until the preceding command with context having the particular context value is processed.

10. A method of communicating commands in a distributed managed system, including:
    a) originating commands from a plurality of clients, at least some commands having a desired destination of one or more targets, including a first target;
    b) receiving the commands from the plurality of clients at a management processor;
    c) generating a context value for each received command having a desired destination of the one or more targets, the context value indicating a particular client originating a corresponding command;
    d) adding, by the management processor, the context value to each corresponding command to create corresponding commands with context;
    e) dispatching each command with context from the management processor to a corresponding desired destination;
    f) receiving commands with context from the management processor to at least one target, including the first target;
    g) at the first target, interpreting the context value for each received command with context to identify the particular client that originated the corresponding command with context;
    h) at the first target, determining a priority and sequence for processing the received commands with context using multi-user/multi-tasking policies, the determined priority and sequence based at least in part on the context value associated with the corresponding commands with context; and
    i) at the first target, processing each received command with context according to the determined priority and sequence.

11. The method of claim 10, wherein a) includes originating login commands from at least one client and b) includes receiving login commands from the at least one client, the method further including:
    j) in response to receiving a login command from each at least one client at the management processor, performing a login process to properly log in the corresponding client prior to authorizing the generating of a context value in c) for each received command having a desired destination of one or more targets from the corresponding client.

12. The method of claim 10, further including:
    j) at the first target, using a first multi-user policy to accept all commands with context at all times.

13. The method of claim 10, further including:
    j) at the first target, using a second multi-user policy to accept commands with context having a particular context value until a predetermined timeout period elapses after receipt of a last command with context having the particular context value.

14. The method of claim 13, further including:
    k) at the first target, rejecting commands with context having a context value different than the particular context value when the second multi-user policy is active.

15. The method of claim 13, further including:
    k) at the first target, storing commands with context having a context value different than the particular context value in a queue when the second multi-user policy is active; and
    l) processing the commands with context stored in the queue after the second multi-user policy is inactive.

16. The method of claim 10 wherein at least one client is also adapted to originate lock commands and corresponding subsequent unlock commands having a desired destination of the at least one target, including the first target, the method further including:
    j) at the first target, using a third multi-user policy to accept commands with context having a particular context value associated with the at least one client after a lock command with context from the at least one client is received and until an unlock command with context from the at least one client is received.

17. The method of claim 16, further including:
    k) at the first target, rejecting commands with context having a context value different than the particular context value associated with the at least one client when the third multi-user policy is active for the at least one client.

18. The method of claim 16, further including:
    k) at the first target, storing commands with context having a context value different than the particular context value associated with the at least one client in a queue when the third multi-user policy is active for the at least one client; and
    l) processing the commands with context stored in the queue after the third multi-user policy is inactive for the at least one client.

19. The method of claim 10, further including:
    j) at the first target, using a first multi-tasking policy to accept all commands with context having a particular context value without delay.

20. The method of claim 10, further including:
    j) at the first target, using a second multi-tasking policy to queue commands with context having a particular context value until a preceding command with context having the particular context value is processed.

21. A method of communicating commands in a distributed managed system, including:
    a) receiving commands originating from a plurality of clients at a management processor, at least some commands having a desired destination of one or more targets;
    b) generating a context value for each received command having a desired destination of the one or more targets, the context value indicating a particular client originating a corresponding command;
    c) adding, at the management processor, the context value to each corresponding command to create corresponding commands with context; and d) dispatching each command with context from the management processor to a corresponding desired destination of the one or more targets, wherein each of the targets decides how to handle received commands with respect to local multi-tasking policies so management of the multi-tasking policies is distributed to the targets instead of maintaining centralized control of the multi-tasking policies at the management processor.

22. A method of communicating commands in a distributed managed system, including:
- receiving, at a management processor, commands destined for a target;
- adding, at the management processor, to the commands context that includes a data field that uniquely identifies a client that originated a corresponding command;
- receiving the commands with context from the management processor at the target, each command with context originating from a particular client of a plurality of clients and including a context value indicating the particular client;
- interpreting, at the target, the context value for each received command with context to identify the particular client that originated the corresponding command with context; and
- processing, at the target, each received command with context, wherein targets include intelligence that processes and implements received commands with context using multi-user/multi-tasking policies so management and command line processing of the commands are distributed to the targets instead of the management processor.

23. The method of claim 22, wherein the management processor does not include intelligence to process the multi-user/multi-tasking policies since the targets implement the multi-user/multi-tasking policies independent of the management processor.

24. A distributed managed system, including:
- a plurality of targets, including a first target, each target including:
  - an agent, the agent including:
    - a context interpreter process; and
  - a command line processor in communication with the agent;
- a plurality of clients, each client adapted to originate one or more commands, at least some commands having a desired destination of one or more targets, including the first target; and
- a management processor, including:
  - an agent/dispatcher adapted to receive commands originated by the plurality of clients, the agent/dispatcher including:
    - a context generation process that generates a context value for each received command having a desired destination of one or more targets, the context value indicating a particular client that originated a corresponding command;
    - a context stamping process in communication with the context generation process that adds the context value to each corresponding command to create corresponding commands with context; and
    - a dispatching process in communication with the context stamping process that dispatches each command with context to the desired destination;
- wherein the agent in at least one target, including the first target, is adapted to receive commands with context from the management processor;
- wherein the context interpreter process in the at least one target, including the first target, interprets the context value in each received command with context to identify the particular client that originated the corresponding command with context; and
- wherein the command line processor in the at least one target, including the first target, processes the received commands with context.

25. The distributed managed system of claim 24, the agent further including:
- a multi-user/multi-tasking policy process in communication with the context interpreter process;
- wherein the multi-user/multi-tasking policy process in the at least one target, including the first target, determines a priority and sequence for processing the received commands with context using multi-user/multi-tasking policies, the determined priority and sequence based at least in part on the context value associated with the corresponding commands with context; and
- wherein the command line processor in the at least one target, including the first target, processes the received commands with context according to the determined priority and sequence.

* * * * *